United States Patent [19]
Williamsen et al.

[11] Patent Number: 5,279,092
[45] Date of Patent: Jan. 18, 1994

[54] PRESSURE WALL PATCH

[75] Inventors: Joel E. Williamsen, Huntsville; Bruce C. Weddendorf, Decatur, both of Ala.

[73] Assignee: The United States of America as represented by the Administrator, National Aeronautics and Space Administration, Washington, D.C.

[21] Appl. No.: 961,293

[22] Filed: Oct. 15, 1992

[51] Int. Cl.⁵ ............................................. E02D 37/00
[52] U.S. Cl. ....................................... 52/514; 114/227
[58] Field of Search ................. 114/227X; 52/514OR

[56] References Cited

U.S. PATENT DOCUMENTS

| 3,094,964 | 6/1963 | Witten et al. | 114/227 |
| 3,857,249 | 3/1973 | Kelly et al. | 114/227 |
| 5,143,012 | 9/1992 | Elkowitz | 114/227 |
| 5,199,238 | 4/1993 | Maestas | 52/514 |

FOREIGN PATENT DOCUMENTS

| 0878648 | 11/1981 | U.S.S.R. | 114/227 |
| 1055684 | 11/1983 | U.S.S.R. | 114/227 |

Primary Examiner—Carl D. Friedman
Assistant Examiner—Wynn E. Wood
Attorney, Agent, or Firm—Robert L. Broad, Jr.; Guy M. Miller; John R. Manning

[57] ABSTRACT

A rigid patch body for placing over and around a damaged portion (hole) of the external wall of a pressurized vessel, such as a space vehicle or habitat. The rigid patch body allows a person such as an astronaut to make temporary repairs to the pressurized vessel from the exterior of the vessel to enable more permanent repairs to be made from the interior of the vessel. The pressure wall patch of the present invention includes a floor surrounded by four side members. Each side member includes a threaded screw for anchoring the patch body to the external wall of the pressurized vessel and a recess in its lower surface for supporting an inflatable bladder for surrounding the damaged portion (hole) of the external wall to seal the area surrounding the damaged portion to allow the vessel to be repressurized. The floor of the rigid patch body supports a source of gas in communication with a gas supply valve and a gas supply gauge in communication with the gas supply valve and the inflatable bladder.

19 Claims, 2 Drawing Sheets

PRESSURE WALL PATCH

ORIGIN OF THE INVENTION

The invention described herein was made by employees of the United States Government and may be manufactured and used by the Government for governmental purposes without the payment of any royalties thereon or therefor.

FIELD OF THE INVENTION

The present invention relates generally to a wall patch for repairing a damaged portion (hole) in a pressurized vessel. More particularly, this invention relates to an emergency pressure wall patch that can be applied to the exterior of a spacecraft, such as a space vehicle or habitat, following a meteoroid impact or other pressure wall breach to repair a damaged portion (hole) in the external wall of a spacecraft to allow pressure to be restored and maintained in the spacecraft.

BACKGROUND OF THE INVENTION

The prior art devices used for making emergency repairs to holes in pressurized spacecrafts made by meteoroid impacts or other pressure wall breaches are designed for placement on the internal wall of the spacecraft through use of adhesives. These holes normally have rough, petalled, outer edges in that they result from meteors impacting the outer wall of the spacecraft and causing depressurization of the spacecraft. The prior art devices require a smooth, accessible, surface for placement of the device on the internal wall of the spacecraft, thus their use requires considerable cutting and grinding of the wall surface by pressure-suited astronauts prior to the placement of the device over the hole. The need for the cutting and grinding operations is a major drawback or disadvantage of such prior art devices. Another major drawback or disadvantage of such prior art devices results from the fact that many areas of a spacecraft are not readily accessible for repairing the hole, particularly those internal walls of the spacecraft behind and covered by equipment racks, utility lines and the like. An emergency repair to holes in these areas of the spacecraft would be very time consuming and burdensome in that it would often require a complete disassembly of the equipment racks and/or removal or rerouting of such utility lines and the like prior to the making of the repair by pressure suited astronauts.

The present invention overcomes the disadvantages or drawbacks of the prior art devices as well as provides several distinct advantages thereover in that it provides a pressure wall patch that is placed over and around the hole (damaged portion) from the exterior of the spacecraft. The device of the present invention requires no wall preparation (cutting, grinding etc.) prior to use, thus eliminating danger to pressure-suited astronauts from sharp hole edges and from tools used for cutting, grinding, etc. The device of the present invention can be used to repair a hole in the wall in an area of the spacecraft that is not readily accessible from the interior of the spacecraft without performing some major disassembly of the spacecraft. The device of the present invention, once in place, also allows safer, more permanent, wall repair to be conducted in a shirt sleeve environment from the interior of the spacecraft by the astronauts.

Typical spacecrafts, such as space vehicles or habitats, are comprised of a pressurized enclosure whose external surface, which may be flat, cylindrical or spherical, is generally formed of an isogrid (or orthogrid) structure. The isogrid structure is generally defined by upstanding ribs which isolate adjacent portions of the surface from each other and adds structural rigidity to the spacecraft.

The device of the present invention requires no redesign of the existing pressure walls of conventional spacecraft other than the possible prior addition of numerous, pre-drilled, shallow tapped holes in the intersecting or other areas of the existing isogrid structure or numerous holes pre-drilled in the existing isogrid structure generally parallel to the outer pressure wall surface.

SUMMARY OF THE INVENTION

According to the present invention, there is provided a rigid patch body for placing over and around a damaged portion (hole) in the external wall of a pressurized vessel to enable repairs to the external wall to be made from the interior of the pressurized vessel. The patch body includes a floor surrounded by a wall (which may be four side members). The wall includes a lower surface which supports an inflatable bladder for sealing an area surrounding the damaged portion (hole) of the pressurized vessel. The patch body also includes means for anchoring the patch body to the raised ribs of the isogrid structure on the external surface of the pressurized vessel and means mounted on the floor of the patch body for inflating, deflating and monitoring the inflatable bladder and monitoring the pressure within the interior of the pressurized vessel.

Accordingly, it is an object of the present invention to provide a wall patch for a pressurized vessel which is simple in construction and relatively inexpensive to manufacture.

It is still a further object of the present invention to provide an emergency wall patch for a pressurized vessel which is simple in construction, relatively inexpensive to manufacture, and adapted to be easily placed and secured over an unwanted hole to seal the hole to allow the vessel to be repressurized.

The above and other aspects, objects and advantages of the present invention will become readily apparent to those skilled in the art to which this invention pertains from a study of the preferred embodiments as set forth in the specification, drawings and appended claims.

DESCRIPTION OF THE PREFERRED EMBODIMENTS

Figure 1:
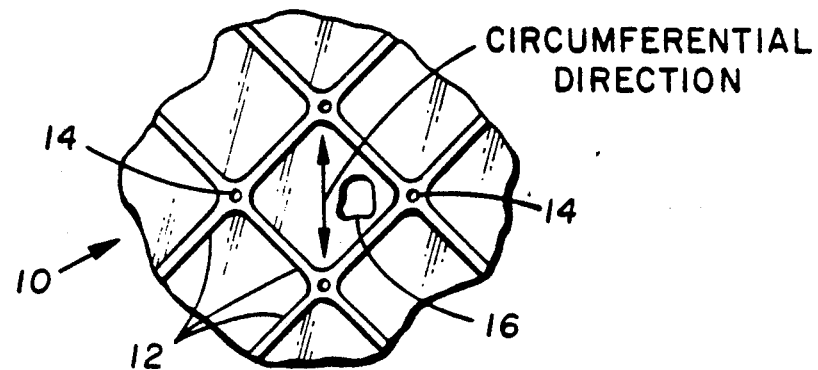
FIG. 1 is a partially broken away plan view of the outer surface of a conventional, cylindrical, pressurized vessel with the pre-drilled tapped holes and showing a damaged portion of the outer wall of the pressurized vessel.
Figure 4:
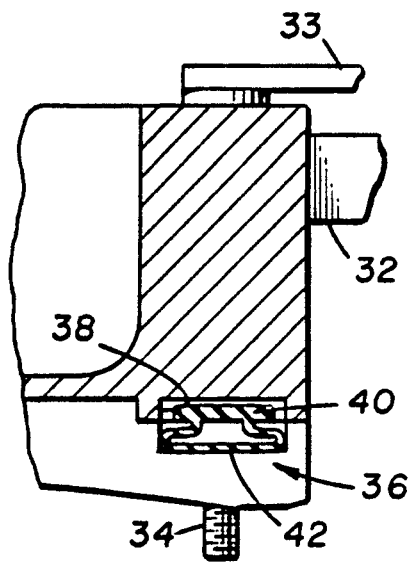
FIG. 4 is a cross-sectional view along lines 4—4 of FIG. 3 showing a portion of the pressure wall patch of the present invention.

Referring now to FIGS. 1 and 4 of the drawings, reference numeral 10 generally designates a segment of the typical outer wall of a conventional, spherically-shaped spacecraft with the outer wall 10 having a generally, diamond-shaped, isogrid, upstanding or raised rib, structure 12. Reference numeral 14 designates a shallow tapped hole which is drilled into each intersecting area of the isogrid structure 12 on the outer wall of the conventional, spherically-shaped, spacecraft. Reference numeral 16 (FIG. 1) designates a hole (damaged portion) in the outer wall 10 within a diamond-shaped section of the isogrid structure 12 which has been created by a meteoroid impact, which hole 16 (damaged portion) needs repairing to enable the repressurization of the spacecraft.

Figure 2:
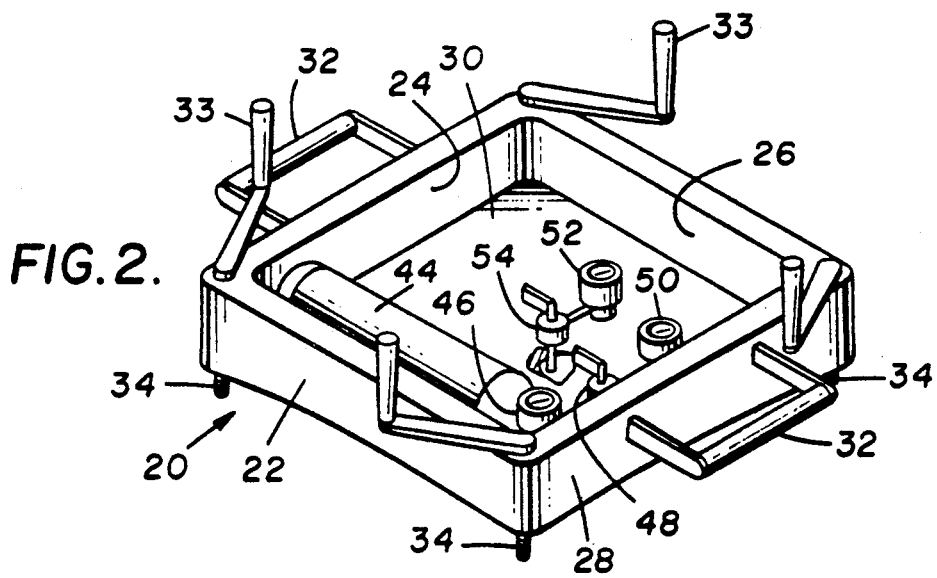
FIG. 2 is a perspective view of a first embodiment of the pressure wall patch of the present invention. The floor is shown to be partially broken away to illustrate the area (chamber) between the floor and the surface of the pressurized vessel.
Figure 3:
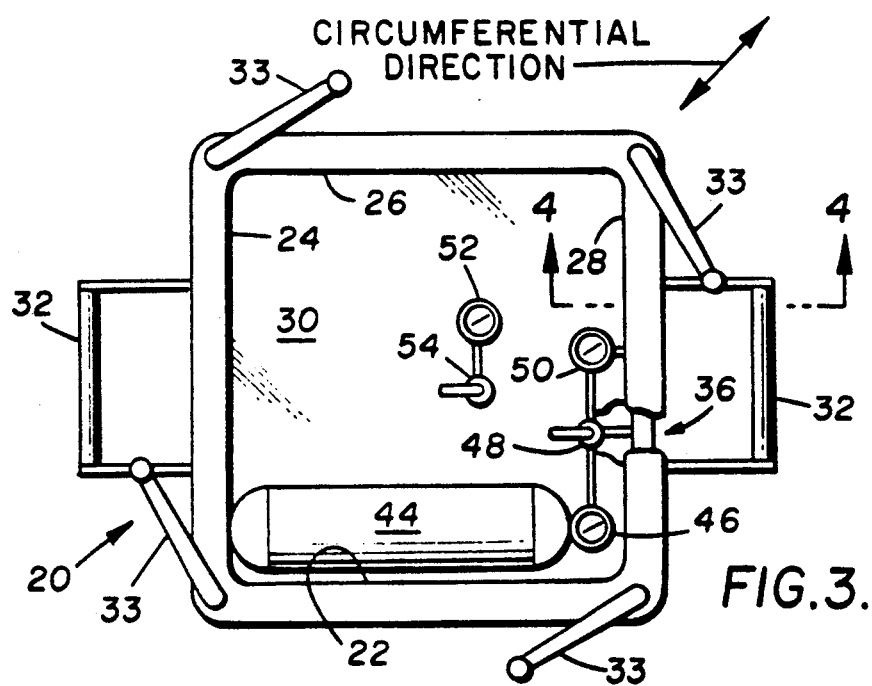
FIG. 3 is a top plan view of the pressure wall patch of the present invention. The floor and wall of the wall patch is shown to be partially broken away to illustrate the communication between the gas supply and seal assembly.

Referring now to the first embodiment of the present invention as depicted in FIGS. 2–4 of the drawing, reference numeral 20 designates a generally square-shaped rigid patch body. Patch body 20 includes four side members 22, 24, 26 and 28, with each side member having a concave lower surface (unnumbered); a floor 30 secured to each of the side members 22, 24, 26 and 28; a pair of handholds or handles 32, each secured to one of side member 24 and 28; a hand crank 33 having a threaded bolt 34 rotatably secured in each corner of patch body 20; a recess 38 (FIGS. 4 and 5) in the lower surface of each of side members 22, 24, 26 and 28; a seal assembly 36 mounted in a recess 38. Seal assembly 36 includes a support member 40 mounted within recess 38 in the lower surfaces (which are concave for spacecrafts having a cylindrical or spherical external surface) of side members 22, 24, 26 and 28 and a bladder 42 secured to support member 40. The floor 30 of patch body 20 serves to support the necessary apparatus for inflating, deflating and monitoring the seal 36 and monitoring the pressure in the interior of the pressure vessel, which apparatus includes a gas supply bottle 44; a gas supply gauge 46 in communication with gas supply bottle 44, a gas supply valve 48 in communication with gas supply gauge 46 and inflatable bladder 42, a seal gauge 50 in communication with inflatable bladder 42, an internal pressure checking gauge 52 in communication with the interior of the spacecraft, and a pressure relief valve 54 in communication with the chamber formed in the underside of floor 30 of patch body 20. The lower surfaces (unnumbered) of side members 22, 24, 26 and 26 of patch body 20 are concave for making repairs to spacecrafts having cylindrical or spherical external surfaces and flat (straight) where the external surfaces of the spacecraft are flat.

Figure 5:
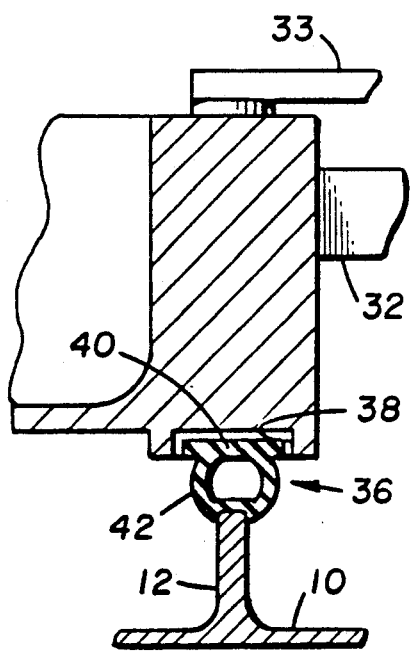
FIG. 5 is a cross-sectional view, similar to FIG. 4, of a portion of the pressure wall patch of the present invention showing the sealing of the patch with the outer wall of the pressurized vessel.

If a meteor or other object should impact the spacecraft to create a hole, such as hole 16, in the external wall of the spacecraft, thus causing depressurization of the spacecraft, the hole, utilizing the embodiment of the rigid patch body 20 depicted in FIGS. 2–5, would be repaired in the following manner. A pressure-suited astronaut would exit the spacecraft with an assembled rigid patch body 20 and go to an area adjacent the damaged portion (hole 16) of the spacecraft. The astronaut would then grasp the handholds 32 of patch body 20, place the patch body 20 into a position over the damaged portion (hole 16), aligning and fitting a threaded bolt 34 within a respective pre-tapped hole 14 in the upstanding, raised, ribs of isogrid structure 12 of the spacecraft. The astronaut then tightens each bolt 34 by turning hand cranks 33 to secure the threads of each bolt 34 to the threads of a tapped hole 14. Once the rigid patch body 20 is secured in position, the astronaut will then open gas supply valve 48 which releases a gas from the gas supply bottle 44 to fill the inflatable bladder 42 with gas so that bladder 42 of seal assembly 36 engages the outer edge of the raised rib of isogrid structure 12 as depicted in FIG. 5, thus forming a chamber between floor 30 and the external outer wall of the pressurized vessel to seal the area around the damaged portion (hole 16) of the external wall of the spacecraft. After bladder 42 is properly inflated, the pressure of gas supply valve 48 is monitored by gas supply gauge 46 and the pressure within bladder 42 is monitored by seal gauge 50. Once the full seal operating pressure is reached, the gas supply valve 48 is turned off and the sealing of the area around the damaged portion (hole 16) is complete at which time the internal pressure within the spacecraft is monitored by internal pressure checking gauge 52. With rigid patch body 20 in place, one or more astronauts may then make more permanent repairs to the damaged portion (hole 16) from the interior of the spacecraft. When the permanent repairs are completed, a pressure-suited astronaut may again exit the spacecraft to remove the patch body 20 by first turning the internal pressure relief valve 54 to its vent position to remove all pressure in the chamber between the repaired external wall of the spacecraft and the patch body 20. The astronaut then deflates the inflatable seal 36 by turning the gas supply valve 48 to the vent position, after which the astronaut grasps one of handholds 32 and removes the patch body 20 by turning each hand crank 33 until each threaded bolt 34 disengages itself from its respective tapped hole 14. The astronaut then reenters the spacecraft bringing with him the patch body 20. It is not always necessary to remove the patch body 20 from the spacecraft, after the more permanent repairs have been made from the interior of the spacecraft, particularly when the spacecraft will not be reentering the atmosphere of the earth on its own as the re-entry vehicle.

Figure 6:
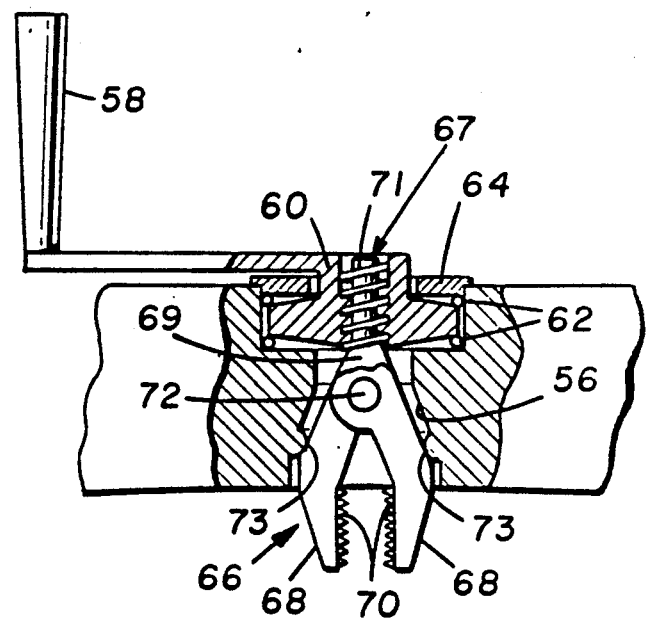
FIG. 6 is a partial cross-sectional view showing a second embodiment of portions of the pressure wall patch of the present invention.

FIG. 6 depicts a second embodiment of the apparatus for anchoring the patch body 20 to the raised ribs of isogrid structure 12 on the outer wall of the pressurized vessel. The embodiment depicted in FIG. 6 differs from that disclosed in FIGS. 2–5 only in the mechanism for fastening or anchoring the patch body 20 to the raised ribs of isogrid structure 12. In lieu of threaded bolts 34 for engaging the tapped holes 14 as used with the embodiment depicted in FIGS. 2–5, the embodiment of FIG. 6 employs a gripping element 66 (a pair of jaws) for engaging the opposed sides of the raised ribs of isogrid structure 12. Referring now to FIG. 6, each of the side members 22, 24, 26 and 28 or corners of patch body 20 includes a tiered recess 56 for receiving a major portion of the patch body anchoring mechanism 66. In the embodiment of FIG. 6, each hand crank 58 has a cylindrical internally threaded nut 60 secured thereto with the cylindrical internally threaded nut 60 being journalled in bearings 62 within an upper tier of recess 56 and being retained in the upper tier by a collar 64. The gripping element 66 includes a pair of jaws 68 and a tang member 67, each jaw 68 having a circular bore (unnumbered) in its upper end and the tang member 67 including a flat lower plate 69 having a circular bore (unnumbered) in its lower end and a round upper end (unnumbered) having external threads 71 thereon. The gripping element 66 is assembled by placing the flat lower plate 69 of tang member 67 between the jaws 68 and hingedly securing them together by inserting a pin 72 or other conventional securing means within the bores (unnumbered) of each jaw 68 and lower plate 69 of tang member 67. The external threads 71 on the round upper end of tang member 67 engage the internal threads on cylindrical nut 60, with both jaws 68 having gripping surfaces 70. Cam surfaces 73 are provided in a lower tier of recess 56 for engaging the outer surface of each jaw 68 to force the gripping surfaces 70 inwardly. A spring might be provided to normally urge the gripping surfaces apart.

Figure 7:
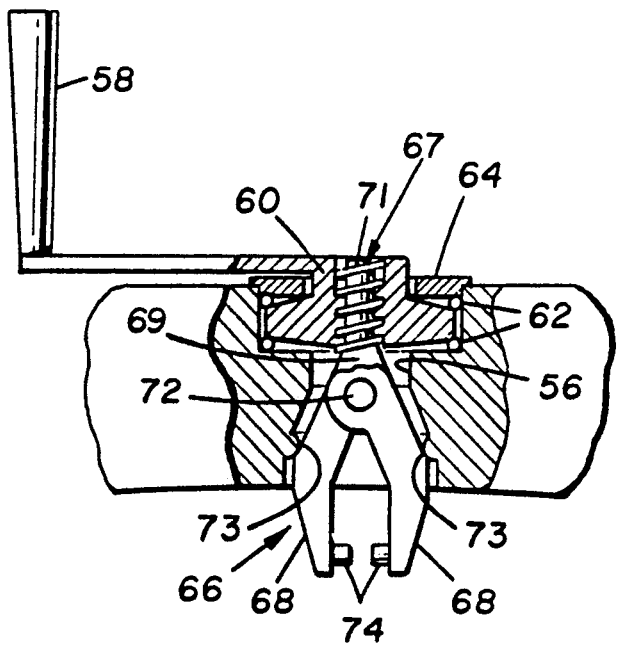
FIG. 7 is a partial cross-sectional view showing a third embodiment of portions of the pressure wall patch of the present invention.

FIG. 7 depicts a third embodiment of the apparatus for anchoring the patch body 20 to the raised ribs of isogrid structure 12 on the outer wall of the pressurized vessel. The embodiment depicted in FIG. 7 differs from that disclosed in FIG. 6 by the substitution of a pair of pins 74, for the gripping surfaces 70 as depicted in FIG. 6, for engaging the walls of pre-drilled openings (not shown) in the raised rib of isogrid structure 12, which holes run generally parallel to the outer pressure wall surface.

The operation of the embodiments depicted in FIGS. 6 and 7 is substantially the same as that for the embodiment depicted in FIGS. 2-5. The only difference being in the manner that the patch body 20 is secured or anchored to the external wall of the pressurized spacecraft.

While the above description constitutes preferred embodiments of the present invention, it will be appreciated that the invention is susceptible to modification, variation and change without departing from the proper scope and fair meaning of the accompanying claims. For example, the seals need not be established on the upper surface of the upstanding ribs of isogrid structure 12 as depicted in the drawings as the seals could be established on one side of the upstanding ribs or on the surface of the external wall of the spacecraft immediately inside of the upstanding ribs of isogrid structure 12. Furthermore, as explained hereinabove, the patch body 20 need not be square, but could be circular or of other configuration. Still furthermore, as explained hereinabove, the pressure wall patch of the present invention is adapted for use to make repairs to pressurized vessels having a generally flat, rather than a cylindrical or spherical, outer surface.

We claim:

1. An apparatus for making repairs to a damaged external wall of a pressure vessel, said external wall including an outer surface, said apparatus comprising:
   a frame including upstanding closure means and a floor;
   means for securing said frame to said external wall of said pressure vessel for spaced relation of said floor and said outer surface of said external wall;
   inflatable seal means peripherally disposed around said frame, said inflatable seal means forming a chamber between said floor and said outer surface of said wall by enclosing the space between said floor and said external surface of said wall responsive to inflation of said inflatable seal means; and
   inflating means for inflating said seal means for engagement of said seal means with said external surface of said wall to provide an air-tight relation.

2. The apparatus of claim 1 wherein said closure means includes a lower surface having a recess therein and said inflatable seal means includes a support member mounted within said recess and an inflatable bladder.

3. The apparatus of claim 2 wherein said inflating means includes a gas supply source and a gas supply valve in communication with said inflatable bladder.

4. The apparatus of claim 3 wherein said outer surface of said external wall includes upstanding ribs forming an isogrid structure and said frame has a configuration similar to that formed by said isogrid structure.

5. The apparatus of claim 4 wherein said inflatable bladder engages the outer edge of said upstanding ribs to provide said air-tight relation responsive to the inflation of said bladder.

6. The apparatus of claim 5 wherein said closure means of said frame includes four side members which form a generally square said frame.

7. The apparatus of claim 6 wherein said means for securing said frame to said external wall of said pressure vessel includes a plurality of spaced, tapped, holes in said upstanding ribs, a plurality of bolts having upper and lower ends mounted within said side members, each bolt having a hand crank secured to said upper end and threads at said lower end, said threads of said bolts being adapted for engagement with said tapped holes in said upstanding ribs.

8. The apparatus of claim 6 wherein each of said upstanding ribs has opposed edges and said means for securing said frame to said external wall of said pressure vessel includes a recess in each of said side members, and a plurality of gripping elements having upper and lower ends, each of said gripping elements being mounted in one of said recesses in said side members and including a pair of pivotally connected jaws, each jaw having internal surfaces on said lower end for grasping said opposed edges of one of said upstanding ribs.

9. The apparatus of claim 6 wherein each of said upstanding ribs has an aperture therein and said means for securing said frame to said external wall of said pressure vessel includes a recess in each of said side members, and a plurality of gripping elements having upper and lower ends, each of said gripping elements being mounted in one of said recesses in said side members and including a pair of pivotally connected jaws, each jaw having a pin extending inwardly on its said lower end and disposed for entering a said aperture in a said upstanding rib to anchor said frame to said external wall of said pressure vessel.

10. An apparatus for making repairs to a damaged portion of the external wall of a pressurized vessel, said apparatus comprising:
   a frame including upstanding closure means and a floor, said closure means having a lower surface, means secured to said lower surface of said closure means of said frame disposed for engagement with said external wall of said vessel for sealing an area surrounding said damaged portion of said external wall of said vessel; said closure means and said floor of said frame defining a chamber beneath said floor;

handhold means secured to said closure means of said frame;

means secured to said closure means for anchoring said frame to said external wall of said vessel; and means mounted on said closure means for moving said external wall engagement means into engagement with said external wall.

11. The apparatus of claim 10 wherein said external wall engagement means secured to said lower surface of said closure means of said frame includes an inflatable bladder.

12. The apparatus of claim 11 wherein said means mounted on said closure means of said frame for moving said inflatable bladder in engagement with said external wall includes a gas supply source and a gas supply valve, said gas supply source being in communication with said gas supply valve and said gas supply valve being in communication with said bladder.

13. The apparatus of claim 12 wherein said means for anchoring said frame to said external wall of said vessel includes an isogrid structure in the form of raised ribs secured to said external wall of said vessel, a plurality of spaced, tapped, hole in said raised rib, a plurality of bolts having upper and lower ends mounted within said closure means, each bolt having a hand crank secured to said upper end and threads at said lower end, said threads of said bolts being adapted for engagement with said tapped holes of said raised ribs of said isogrid structure.

14. The apparatus of claim 12 wherein said means for anchoring said frame to said external wall of said vessel includes an isogrid structure in the form of raised ribs having opposed edges secured to said external wall of said vessel, a plurality of gripping elements having upper and lower ends mounted within said closure means, each gripping element including a pair of pivotally connected jaws, each having internal surfaces on said lower end for grasping said opposed edges of one of said raised ribs of said isogrid structure.

15. The apparatus of claim 12 wherein said means for anchoring said frame to said external wall of said vessel includes an isogrid structure in the form of raised ribs secured to said external wall of said vessel, a plurality of apertures in said raised ribs, a plurality of gripping elements having upper and lower ends mounted within said closure means, each gripping element including a pair of pivotally connected jaws, each having a pin extending internally toward each other on said lower end and adapted to enter into one of said apertures in said raised rib of said isogrid structure.

16. The apparatus of claim 12 wherein said closure means of said frame includes four side members which form a generally square said frame, each said side member including a lower surface having a recess therein, said bladder being mounted within said recesses of said side members.

17. The apparatus of claim 16 including a pressure relief valve in communication with said chamber for relieving pressure from said chamber.

18. The apparatus of claim 16 wherein said lower surface of each of said side members is concave.

19. The apparatus of claim 16 wherein said lower surface of each of said side members is straight.

* * * * *